Dec. 3, 1940.    J. S. BAKER    2,223,539
POLE CABLE TERMINAL
Filed Nov. 14, 1938    5 Sheets-Sheet 1
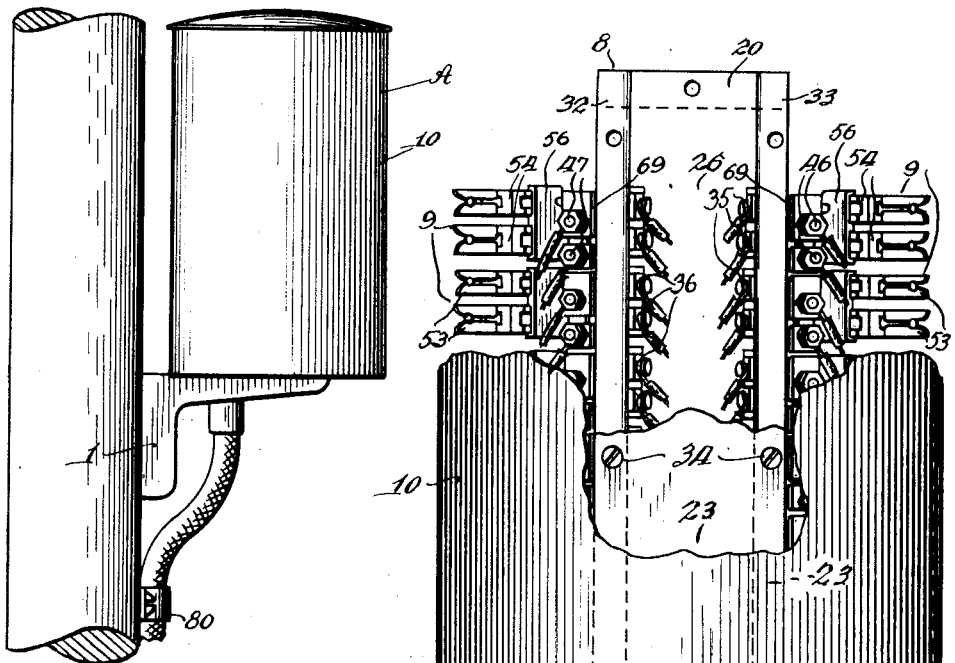
Fig. 1
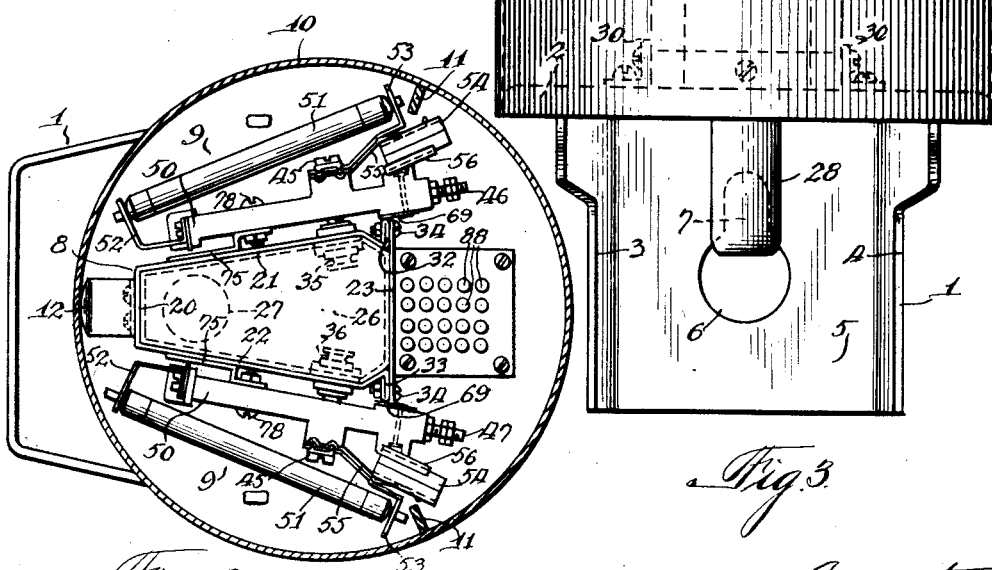
Fig. 2
Fig. 3
Inventor
John S. Baker
By Ambs, Thiess, Olson & Mecklenburger
Attorneys Dec. 3, 1940.  J. S. BAKER  2,223,539
POLE CABLE TERMINAL
Filed Nov. 14, 1938  5 Sheets-Sheet 2
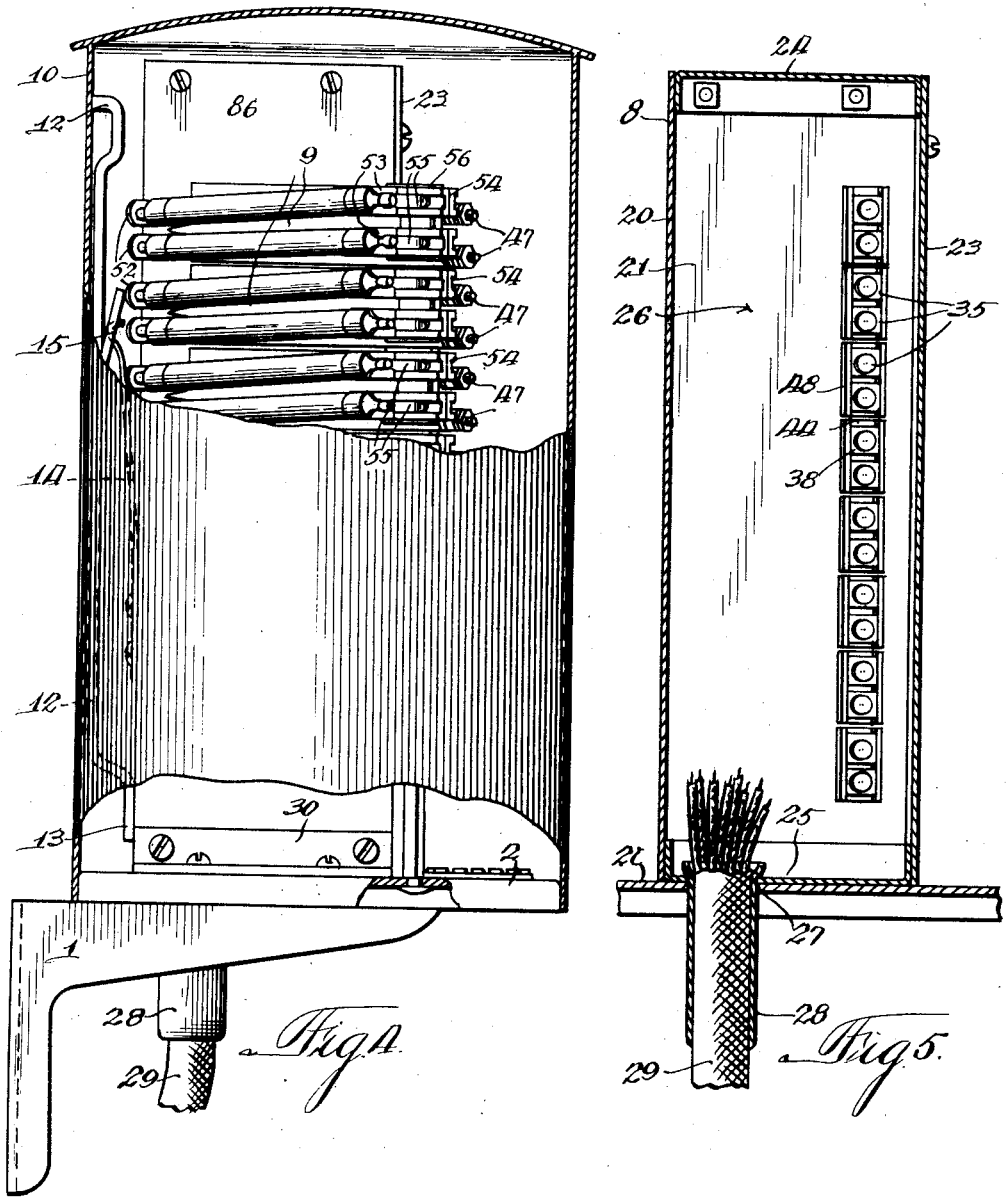

Dec. 3, 1940.   J. S. BAKER   2,223,539
POLE CABLE TERMINAL
Filed Nov. 14, 1938   5 Sheets-Sheet 3
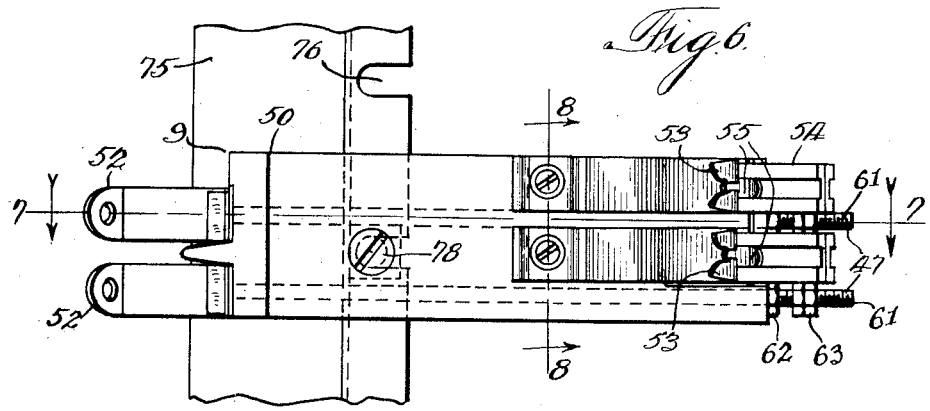
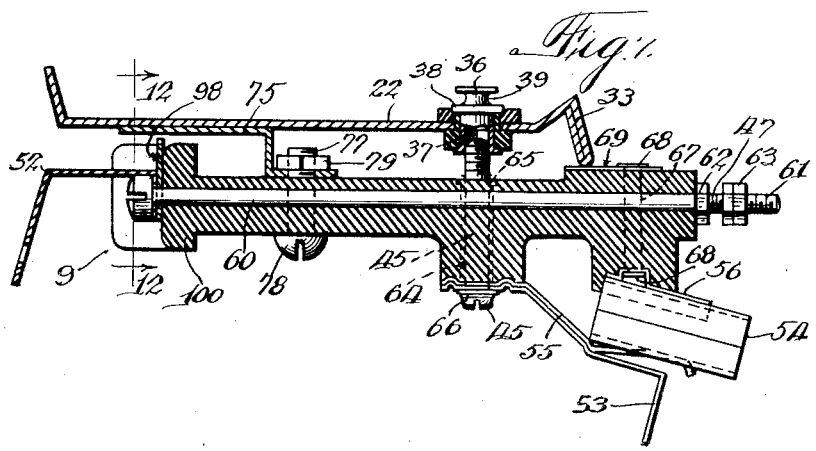
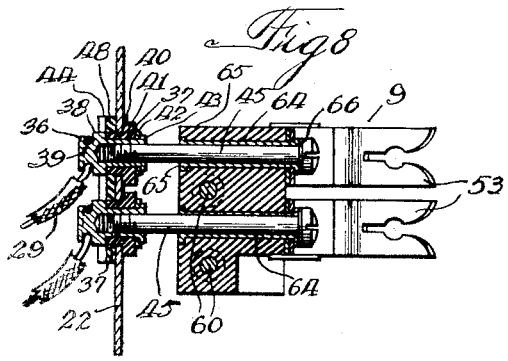
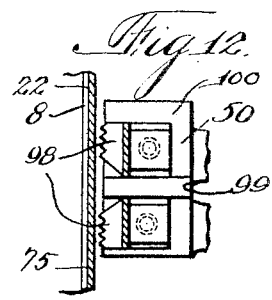
Inventor:
John S. Baker
By Ams, Thiess, Olsen & Mecklenburger
Attys Dec. 3, 1940.    J. S. BAKER    2,223,539
POLE CABLE TERMINAL
Filed Nov. 14, 1938    5 Sheets-Sheet 4
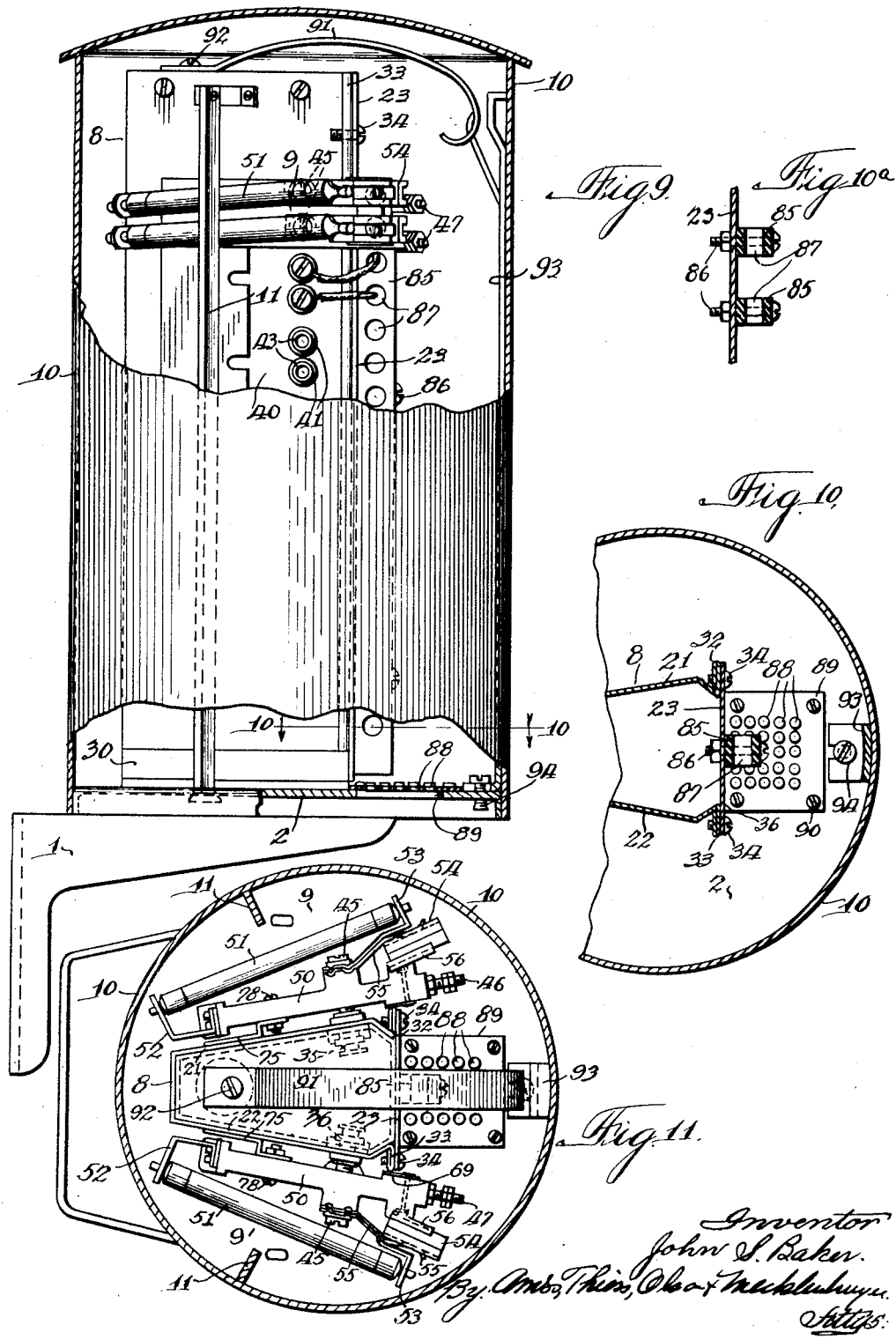

Dec. 3, 1940.   J. S. BAKER   2,223,539
POLE CABLE TERMINAL
Filed Nov. 14, 1938   5 Sheets-Sheet 5
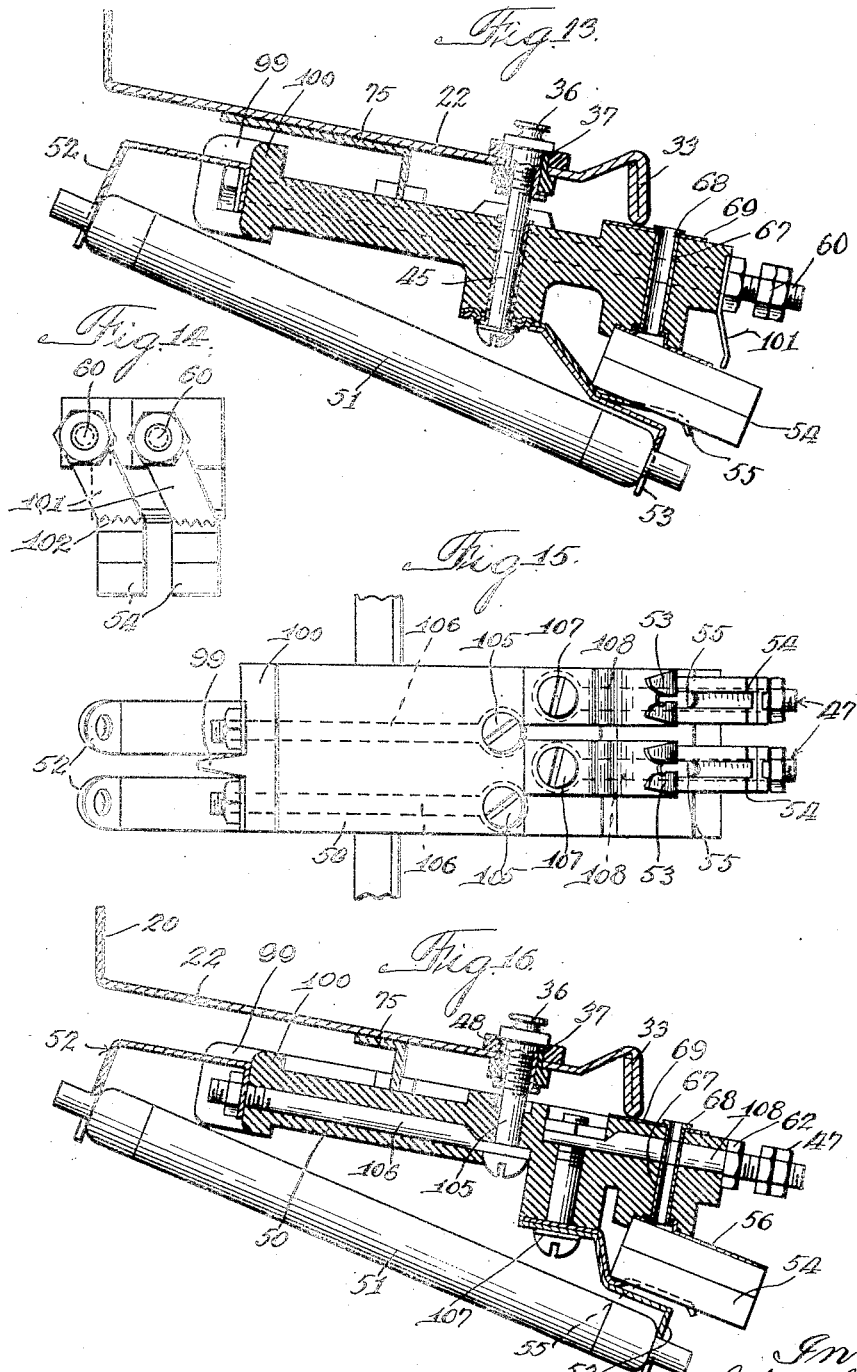
Inventor
John S. Baker
By Amss, Thies, Olsa & Mecklenburg
Attys Patented Dec. 3, 1940

2,223,539

UNITED STATES PATENT OFFICE 2,223,539

POLE CABLE TERMINAL

John S. Baker, Chicago, Ill., assignor to Cook Electric Company, Chicago, Ill., a corporation of Illinois Application November 14, 1938, Serial No. 240,355

17 Claims. (Cl. 175—307)

This invention relates to cable terminals and more particularly to terminal boxes for electric cables adapted to be mounted on telephone poles and other like supports, carrying telephone line cables, to provide for ready connection to the drop wires leading to subscribers' instruments.

Terminals of the character referred to are usually mounted on poles where it is difficult to work if the parts are not readily accessible. Usually, it is desirable to protect the cable against the entrance of moisture by providing a moisture-tight chamber or compartment into which the cable may be extended and its wires distributed to the terminal posts of subscribers' lines. However, it is preferable that these terminal posts are readily accessible in order to permit making the necessary changes in and additions to the wiring connections, that must be made at different times, to correspond to changes in and additions to the customers' lines. These terminal posts are generally provided in two distinct sets. One set is arranged to receive the cable wires, while the other set is arranged to receive the drop wires leading to subscribers' instruments. In certain instances, it is desirable to protect the equipment against injurious current that may surge through the line at times. In such cases, protectors in the form of unit structures, each usually consisting of a fuse and lightning arrester, may be inserted between these terminals.

The use of such protectors, in view of their general construction and the design employed, has necessitated placing one set of these terminal posts at the rear of the housing, which has caused unnecessary trouble to linemen, braced in hazardous positions on telephone poles, making the aforesaid changes in the wiring connections between subscribers' lines and cable wires. Linemen have been heretofore required to reach about the front of the box to the rear to perform the necessary soldering operations or to make the necessary binding post connections, all in greatly inaccessible locations.

One of the objects of the invention is to provide a terminal box of improved construction, having, as one of its features, an improved arrangement of parts whereby both sets of terminal posts as well as the lightning arresters are disposed at the front of the box and are readily and conveniently accessible. This construction eliminates the necessity of reaching behind the box, around protectors and a great number of wires forming the connections in order to make changes therein. Consequently, the task of making a connection, or change therein, by a lineman on the pole will be made easier and the possibility of error in his work greatly reduced.

Another important feature of the invention resides in the construction of the aforesaid protector usually employed in cable terminals between the cable wires and the customers' drop wires. The protector herein disclosed is provided as a unit structure that may be readily attached so that it may be readily added to the cable terminal as additional customers' lines are required without increased cost in the construction and without the use of special tools or equipment. Moreover, the construction of the protector and its unique form of mounting advantageously exposes both sets of terminal posts at the front of the box in a convenient and readily accessible location.

A still further object of the invention is the simple and compact arrangement of the parts resulting from the improvements herein disclosed. An exceptionally close connection with respect to the pole may be made for the cable where it enters the housing so as to reduce at this point the strain upon the lead sheath of the cable. This strain is the result of vibrations being transmitted along the pole, which are usually considerable and cause much damage upon reaching the lead sheath at this point if the latter is not properly supported and its connection is not closely made at the pole. The present design affords a very close connection and reduces to a minimum the necessary distance between the pole and the point of connection at the housing.

A still further object resides in the manner of mounting these protector units whereby they may be readily omitted, if so desired, and the subscribers' lines may be connected directly to the posts extending through the housing at the front from the terminal connections inside of the housing that receive the cable wires. Hence, terminals of the character herein disclosed may be used without the protector units where protection for the subscribers' lines is not necessary.

A further object of the invention relates to the parts provided and to the improved arrangement of these parts. If a fuse of one of the protector units blows, there is a complete separation between the equipment on the subscribers' side and the equipment on the cable side. High voltages that may be induced by lightning, or directly obtainable therefrom, or otherwise caused to exist upon the subscribers' lines, are apt to remain for a time upon the cable terminal without being dissipated. This is highly undesirable, particularly when such high voltage charges reach the neighborhood of twenty-five hundred volts. This invention includes the provision of a coarse voltage arrester adapted to be novelly disposed with respect to the parts of the apparatus whereby the lightning arresters of the protector units in each subscriber's line will normally function to dissipate abnormal high voltage charges, but, if one or both fuses or one or both lightning arresters are disabled and the equipment is unprotected from a proper ground, the apparatus on the subscriber's side of the device will be protected against the serious results that are apt to follow from the continued presence of high voltage charges thereon.

A still further object of the invention is to locate this coarse voltage lightning arrester in a manner permitting the line attendant, if he so desires, to test the equipment on the subscriber's side for high voltage charges at any time he is called upon to work thereon, and to ground any existing high voltage charges without injury to the equipment or to himself.

It will be understood that the present invention is also directed to the structural novelty provided by the protector units herein disclosed. These units are simple and inexpensive. The parts thereof are arranged to make electrical connections with the cable terminal posts intermediate the ends of the units and to carry the current rearwardly and then forwardly again, passing through the fuses, to the customers' terminal connections at the front of the housing whereby in a compact unit all parts necessary to provide proper protection, that a unit of this type should provide, are so disposed that the customers' connections and the cable connections may be made at the front of the housing in a very convenient and accessible location.

Other objects and advantages will be apparent from the following description when taken in connection with the accompanying drawings which form a part hereof.

In the drawings:

Figure 1 is an elevation of a cable terminal box embodying the invention and mounted in position upon a pole;

Fig. 2 is an enlarged section taken through the upper portion of the hood to illustrate the position of the protectors on the side walls and the manner in which the cable wire terminals and the customers' drop wire terminals are accessible at the front of the terminal box when the front cover is removed;

Fig. 3 is an enlarged view, partly in elevation and partly in section, a portion of the hood and the front cover being broken away;

Fig. 4 is an enlarged side view with top and bottom portions of the hood broken away;

Fig. 5 is a vertical sectional view through the inner moisture-proof housing to illustrate one row of cable wire terminals adjacent the front edge of one side wall so as to be readily accessible when the front cover is removed;

Fig. 6 is a top elevational view of one form of protector unit with its fuses omitted;

Fig. 7 is a sectional view taken on line 7—7 of Fig. 6;

Fig. 8 is a transverse section taken on line 8—8 of Fig. 6;

Figs. 9 to 11 illustrate a slightly modified form of terminal box embodying the invention, Fig. 10 being a section taken on line 10—10 of Fig. 9 and Fig. 10a being a detail view illustrating a slightly modified arrangement of fanning strips;

Fig. 12 is a view looking at the end of the protector unit shown in Figs. 6 and 7 to illustrate the coarse voltage lightning arrester;

Fig. 13 is a cross-sectional view of a protector unit similar to that shown in Fig. 7 but having the coarse voltage arrester disposed at the front of the housing at the customers' line terminal and arranged to ground through the usual lightning arrester of the unit, although the fuse may blow;

Fig. 14 is a detail view showing the coarse voltage arresters;

Fig. 15 is a top elevational view of a slightly modified form of protector unit; and Fig. 16 is a sectional view taken on line 16—16 of Fig. 15.

The cable terminal illustrated in the drawings is of a type particularly adapted to be mounted upon telephone poles or like supports, as shown in Fig. 1. Bracket 1 includes a platform 2, reenforcing side walls 3 and 4, and a rear wall 5 (Fig. 3) having an opening 6 and an elongated extension 7 for receiving the fastening member (not shown) that holds bracket 1 to the telephone pole.

The pole cable terminal designated generally as A is adapted to be seated upon and carried by platform 2. It comprises a terminal box 8 having protector units 9 mounted upon the sides thereof and a hood 10 adapted to slide over and down upon these parts and rest upon platform 2 to provide a substantially dustproof structure. Vertical guide members 11 carried upon base 2 tend to center hood 10 as it is slipped into position. Hood 10 is tightly held upon base 2 by a spring member 12 (Fig. 4) secured at 13 to the lower portion of housing 8. In order to keep the upper end of spring member 12 tightly pressed against the interior of hood 10, an auxiliary spring member 14 presses at 15 against spring member 12. Auxiliary spring member 14 may be secured to housing 8 at a distance above connection 13.

Cable terminal box or housing 8 is preferably made of sheet metal, such as pressed steel, having a rear wall 20, side walls 21 and 22 and a removable front cover 23. These walls, including a top wall 24 and a bottom wall 25, form a substantial moistureproof chamber 26 (Fig. 5). Bottom wall 25 is provided with an opening 27 to receive a connecting sleeve 28 acting as means to attach the end of a cable 29. This connection may be of a type excluding moisture and foreign substances from chamber 26. Housing 8 may be secured to platform 2 by angle brackets 30.

Assuming that cover 23 represents the front of cable terminal A as it is positioned upon and supported by bracket 1 upon a telephone pole, side walls 21 and 22 have their respective front edges 32 and 33 folded back upon themselves in reenforced relation to receive screws 34 which removably secure cover 23 in position. Adjacent the front edges 32 and 33 are a series of metal terminal posts 35 and 36 mounted upon side walls 21 and 22.

These terminal posts 35 and 36 are arranged in pairs upon each side wall and comprise cylindrical metallic members 37 provided with shoulders 38 and grooves 39 for receiving the electric wires of cable 29, which may be a soldered connection if desired, see Fig. 8. In the assembly, metallic members 37 are passed through openings in an insulation plate 48 and then projected through openings in walls 21 and 22. An insulation sleeve 40 with a head 41 is thereafter slipped over metallic member 37, sleeve 40 entering the holes in walls 21 and 22 and the holes in insulation plate 48 in order to securely insulate sleeves 37 from these walls 21 and 22. A metallic washer 42 is then placed upon the remaining projecting end of metallic members 37 to permit these ends to be riveted over, as indicated at 43 in Fig. 8. Heads 38 lie in a slot 44 in insulation plate 48 in order to lock these parts firmly in position upon walls 21 and 22 when the ends of members 37 are riveted over at 43. Members 37 are internally threaded and are adapted to receive the threaded ends of fastening bolts 45 forming an electrical connection, through protector units 9, between these metallic terminal poles 35 and 36 and a series of subscribers' drop wired terminals 46 and 47 to be presently described.

Protector units 9 each comprises, as shown in Figs. 6 to 8, inclusive, a base 50 of insulation material adapted to carry fuses 51 between clips 52 and 53 and lightning arresters 54 between clips 55 and 56. Protector unit 9 as shown in Figs. 6 and 7 has fuses 51 omitted. Fuse clips 52 are attached at the rear end of each base 50 by rods 60 extending longitudinally through the base. The front ends of rods 60 are threaded as indicated at 61, and are locked by a nut 62. The usual terminal nuts 63 form with the threaded end 61 the aforesaid subscribers' terminal posts 46 and 47. Fuse clips 53, together with clips 55 of the lightning arresters 54, are attached to base 50 by metallic sleeves 64 having heads 65 thereon at one end. After sleeves 64 are inserted transversely through base 50 but in different planes from those of rods 60 so as not to contact with the latter, contact clips 53 and 55 are then positioned upon the ends of sleeves 64 projecting beyond base 50 and these projecting ends of sleeves 64 are then riveted over, as indicated at 66, to lock sleeves 64 in position. The opposite lightning arrester clips 56 are also held by similar metallic sleeves 67 that are riveted over at their ends 68, grounding contacts 69 being in electrical connection with lightning arrester clips 56 through these sleeves 67 to provide an earth connection for these lightning arresters when mounting bracket 1 is grounded.

Protectors 9 may be supplied as they are needed when new subscribers' lines are put into service. Electric wires from cable 29 are distributed to the various pairs of terminal posts 35 and 36. Protectors 9 may be added as desired by bolts 45 passing through sleeves 64 in each base 50 and threading into members 37 of terminal posts 35 and 36, as illustrated in Fig. 8. Although base 50 also engages housing 8 at grounding member 69, it may be desirable, although not essential, to provide an additional support for these protectors 9 upon housing 8. A simple and expedient form may be a bracket 75 fixed to walls 21 and 22 as by welding or the like, which bracket 75 may have a series of slots 76 to receive the shank 77 of bolts 78. Bolts 78 are adapted to pass through each base 50 and enter slots 76 and be held in position by having nuts 79 drawn tightly thereupon against bracket 75, as shown in Fig. 7.

Disposing customers' drop wire terminals 46 and 47 along front edges 32 and 33 in order to be accessible at the front of housing 8 and not at the rear, as heretofore, is the result of the unique type of construction of base 50 of protectors 9. The construction of housing 8 and the location of terminal posts 35 and 36 likewise contribute to this result. Base 50 may be molded with passages for rods 60 and sleeves 64, or these latter parts may be molded in base 50 during the molding operation. Sleeves 64 are located in base 50 to form with bolts 45 the electrical connection from the cable wire terminal posts 35 and 36 to one end of fuses 51. Locating fuse clips 52 and 53 in the manner shown allows the circuit to continue rearwardly of base 50 from the point of connection 64, then through rods 60 from the rear of the base to the front thereof. Rods 60 and sleeves 64 are in different planes so that electrical contact between these parts within base 50 is prevented.

Sleeves 64 may be located anywhere intermediate the ends of base 50. If fuses 51 are of the character shown herein, these sleeves may be disposed substantially closer to the front end of base 50 so that fuses 51 extend in a general rearwardly direction to make proper connections with rods 60. The circuit is then taken back through base 50 by means of these rods 60 having their front ends comprising the customers' drop wire terminals 46 and 47.

The parts are exceptionally simple and few, but they are designed to be carried in a mounted relation that makes both sets of terminals accessible to linemen at the front of housing 8. Access to terminal posts 35 and 36 is obtained through the ready removal of front cover 23 so that they are convenient to the linemen if changes or connections are to be made at these terminals. Moreover, protector units 9 are easily mounted in position and may be made by the linemen on the post without requiring additional tools or equipment.

A feature to be noted is that walls 21 and 22 constitute in effect opposing portions of a wall construction defining chamber 26 and that it is not essential for these walls to be separated by a rear wall but may be in the form of opposite legs of an enclosure that has a removable cover at the front whereby access to both terminal posts 35 and 36 and customers' drop wire terminals 46 and 47 may be obtained at one side of chamber 26 when cover 23 is removed.

Bringing terminal connections 46 and 47 to the front of the terminal box also allows a reduction in the necessary space between the pole and the terminal box. Only such space need now be provided as will allow the hood to slide over and down upon the box 8 to enclose it and the protector units 9 without scraping against the pole. It will not be necessary to provide the same space, as heretofore, between the pole and the cable terminal when linemen are forced to make connections at the rear of the box. Hence, a smaller and therefore lighter mounting bracket 1 can be used and the distance between connection 28 of cable 29 at the base of box 8 and the pole connection 80 can be reduced to a minimum. This is very desirable because it tends to eliminate transmission of pole vibrations beyond point 80. A very rigid connection is provided and minimum cable is required.

Protector units 9 are also considered to be novel. It is appreciated that they have a relatively broad application in this art and therefore not limited in use to pole cable terminals.

Figs. 9, 10 and 11 illustrate a slightly modified form of structure. In order to keep the customers' drop wires properly segregated and held in position for attachment to their respective terminals 46 and 47, without becoming unnecessarily tangled with other such wires that extend to these various terminals, a fanning strip 85 may be attached by screws 86 to front cover 23. The usual holes 87 in fanning strip 85 permit the drop wires to be led upwardly, in the present illustration, through holes 88 in plate 89 secured by fastening means 90 to platform or shelf 2 of pole bracket 1, and then crosswise by means of these holes to the proper terminals 46 and 47. If it is found desirable to use more than one fanning strip, to wit, a fanning strip for the subscribers' terminals on each side of box 8, such an arrangement may be provided, this being illustrated in Fig. 10a.

In this modified form, a different arrangement of hood centering and retaining means is proposed. Vertical guide bars 11 are placed slightly to the rear upon platform 2, while the spring retaining members are at the front in the form of interlocking spring 91 secured to top wall 24 of housing 8 at 92 and a cooperating vertical spring 93 secured at 94 to platform 2. Spring 91 may be curved somewhat at its forward tip. The upper end of spring 93 is strengthened by this curved forward tip of spring 91, there being sufficient resiliency for spring 93 to yield when cover 23 is guided over and upon the terminal box, yet enough strength, by means of spring 91 cooperating with spring 93, to hold hood 10 in position.

These and like modifications are obviously within the scope of the invention disclosed and may be made without departing from the invention.

The purposes of lightning arresters 54 are well understood to those skilled in the art. However, if high voltages are accidentally picked up through the subscribers' lines, they afford no protection to this equipment if a fuse blows because they are usually on the side of the fuses opposite the side connected to the subscribers' lines. Arresters 54 may be of different capacities depending upon their use, but, for the device in question, they may range upwards from five hundred volts. If one of the fuses should blow, there is a complete separation between the equipment on the side of this fuse beginning with clip 52 and extending to the subscribers' lines and the equipment on the other side of the fuse beginning with clip 53 and extending to and through the pole cable. Consequently, any high voltage that may be induced by lightning, or directly obtainable therefrom, or otherwise caused to exist upon this subscriber's line, is apt to remain for a time upon the pole cable terminal without being dissipated. It is undesirable to allow such high voltage to remain upon the pole cable terminal without being immediately grounded, particularly when such high voltage charges reach twenty-five hundred or more volts. It is herein proposed to design protectors 9 in a manner that will protect the equipment at both ends of the fuses against such high voltage charges. This may be accomplished by the use of saw-toothed blades or equivalent arresters 98 disposed at the end of each base 50 having the fuse clips 52 carried upon the rods 60. The discharge edges of arresters 98 may be spaced a predetermined distance from the side wall of housing 8 upon which the protectors are carried. In order to protect these side walls, due to their relative thinness, against having holes burnt therein in the event of a jump of high voltage from the arresters 98 to these side walls, mounting brackets 75 are extended to and under the discharge edge of these arresters. These brackets 75 will reenforce the side walls and admit of obtaining the proper gap for the arresters. The arrangement provides, therefore, a proper ground for these higher voltages usually known as abnormal voltages that may exist upon the subscribers' end of the fuses, which ground prevents these abnormal voltages from remaining any appreciable time at the pole cable terminal equipment and possibly cause damage as a result. Fig. 12 illustrates arresters 98 as they are mounted upon and carried by each protector 9. Inasmuch as each protector as shown is provided to care for a pair of subscribers' lines, bases 50 are each provided at their ends with a separating wall 99 which is adapted to lie between the arresters 98 secured at these ends to the rods 60. Each base 50 has its end 100 enlarged and has separating wall 99 as a projecting fin on this enlarged end so as to separate the arresters 98.

However, base 50 of each unit may have a second arrester, that has been described above as a coarse voltage arrester, disposed to protect the cable terminal and the equipment on the customers' lines through the carbon block of the lightning arresters 54. This may be accomplished, as shown in Figs. 13 and 14, by arrester blades 101, or the like, carried at the front end of rods 60, which front ends of rods 60 are known herein to form the customers' line terminals 46 and 47. Arrester blades 101 may have saw-tooth edges 102 positioned a predetermined distance from lightning arrester block 54 to form a predetermined discharge gap, whereby abnormal high voltage charges may be dissipated through the ground that is established by the carbon block of the arrester 54 and by the clips 56 connecting to sleeve 67, the latter being connected to plates 69 that are suitably grounded, say for example, to housing 8. One of the advantages of the present arrangement is simplicity of construction. Only the arrester blades 101 are necessary as the material required to form this second arrester. These blades 101 are carried upon rods 60 at the terminal ends 46 and 47. No additional parts are essential. Their location permits a lineman to determine whether any accumulated high voltage charges exist on the line before beginning to service the line. A conductor member, such as the pointed end of a screw driver having an insulated handle, may be used to span the blades 101 and the carbon block of arrester 54. If the spark across the discharge gap thus formed continues, he is immediately advised that a closed circuit connection is somewhere on the line and that work on the line at the cable terminal should not proceed until the trouble is located. A momentary spark indicates that a high voltage charge had accumulated but that it had dissipated itself through the ground connection formed by the screw driver. On the other hand, it will be understood that these arresters 101 will serve practically the same purpose as arrester 98 carried at the opposite ends of rods 60, and that, if there is any trouble experienced with linemen inadvertently removing arresters 54 without replacing them, both arresters 98 and 101 may be employed at the same time at opposite ends of rods 60.

Figs. 15 and 16 illustrate a slightly modified form of protector unit coming within the present disclosure. Instead of conducting extraneous currents from subscribers' terminals 46 and 47 through the fuses 51 and then past lightning arresters 54, the current from subscribers' terminals is conducted through bolt 108 past arrester 54 to fuse 51 before entering clip 52, bolts 106 and 105 and bushing 36. Opposite fuse clips 53 and the arrester clips 55 may be secured by a screw 107 threading into base 50 and connecting electrically to a second rod 108 that extends forwardly to form customers' line terminals 46 and 47, as previously described. Lightning arresters 54 may be carried by clips 55 and clips 56 connected by sleeves 67 to ground plates 69 engaging the housing 8 at its front ends 32 and 33. In this embodiment, although not shown, a coarse voltage arrester may be employed, if so desired, in any preferred way, or as previously described. It will be apparent that the construction of base 50 and its parts may be varied without departing from the scope of the invention. The essential features of novelty reside in the structure having the parts so arranged as to bring the lightning arresters and the subscribers' terminals at the front of the box whereby they and the cable terminals will both be available at the same time when the front cover plate 23 is removed.

A further advantage in the use of the present structure is the easy access afforded linemen when connecting subscribers' lines not to be protected by units 9. Frequently, it so happens that it is unnecessary to protect certain subscribers' lines. Protector units 9 may be then omitted for such lines without in any way affecting the use of protector units for customers' lines that are to be protected. Fig. 9 omits a number of protector units 9 on one side in order to show how subscribers' lines may readily be connected, likewise at the front of housing 8, to the terminals formed at 43 by conductor sleeves 37 extending through walls 21 and 22 from cable terminals 35 and 36. If more than one subscriber's line must be protected, other units 9 will be added, but, if they do not need protection, the units are omitted and the subscribers' wires connected directly at 43.

Without further elaboration, the foregoing will so fully explain the gist of my invention that others may, by applying current knowledge, readily adopt the same for use under varying conditions of service, without eliminating certain features, which may properly be said to constitute the essential items of novelty involved, which items are intended to be defined and secured to me by the following claims.

I claim:

1. A cable terminal box comprising a substantially closed housing having a removable cover, two sets of terminals carried by said housing, protector units disposed between the terminals of each set, said protector units carrying one set of terminals at the front end thereof, and means for mounting said terminals and said protector units upon said housing so that both sets of terminals are accessible at one side of said housing when said cover is removed.

2. A cable terminal box comprising a substantially closed chamber having side walls and a removable front wall, cable wire terminals and protector units having subscribers' terminals associated therewith disposed upon said walls, said subscribers' terminals being disposed at the front of said protector units, and means for mounting all of said terminals so that both cable terminals and subscribers' terminals are accessible at the front of said chamber when said front wall is removed.

3. A cable terminal box comprising a substantially closed chamber having side walls and a removable front wall, cable wire terminals and subscribers' drop wire terminals carried by said side walls, one set of terminals being disposed on said side walls inside of said chamber, the other set of terminals being carried by said side walls outside of said chamber, both sets of said terminals being accessible at the front of said chamber when said front wall is removed.

4. A cable terminal box comprising a substantially closed chamber having side walls and a removable front wall, two sets of terminals carried by said side walls, one set of terminals being disposed within said chamber, the other set of terminals being disposed outside of said chamber, connections between said terminals, and means for mounting said terminals and said connections so that both sets of said terminals are accessible at the front of said chamber when said front wall is removed.

5. A cable terminal box comprising a substantially closed chamber having an opening therein for receiving a cable containing a plurality of distribution wires, terminals along opposed walls of said chamber to which said distribution wires are adapted to be connected, a removable cover along said terminals providing when removed access to the interior of said chamber and to said terminals, a second series of terminals mounted exteriorly of said chamber and accessible at the cover side of said chamber, and means for connecting the terminals along said opposed walls with the terminals mounted exteriorly of said chamber.

6. A cable terminal box comprising a chamber having side walls and a removable front wall, said removable wall being disposed along the front edges of said side walls, a plurality of terminals mounted upon the inside of said side walls and along said front edges, said terminals being accessible at the front of said chamber when said front wall is removed, means for mounting a second series of terminals upon said side walls outside of said chamber and exposed for access along said front edges, and means for electrically connecting said interior terminals with said exterior terminals.

7. A cable terminal box comprising opposed walls, a plurality of protector devices mounted upon one side of said opposed walls and having subscribers' terminals associated therewith, a series of terminals upon the opposite side of said opposed walls and means for electrically connecting the subscribers' terminals with said series of terminals through said protectors, both said subscribers' terminals and said series of terminals being disposed along the front edges of said walls.

8. A cable terminal box comprising a substantially closed chamber having side walls, a removable front wall, a plurality of terminal posts disposed on said side walls inside of said chamber and accessible at the front of said housing when said front wall is removed, a plurality of protector units each having an insulation base mounted upon said side walls outside of said chamber, and conductor members including a series of terminal connections for each base in electrical contact with said terminal posts, said conductor members being carried upon each base to dispose said terminal connections at the front of said housing.

9. A cable terminal box comprising a substantially closed chamber having a wall construction with portions opposing each other, a plurality of terminal posts disposed on one side of said opposing wall portions, a plurality of protector units each having a base mounted upon the opposite side of said opposing wall portions, and conductor members including a series of terminal connections for each base in electrical relation with said terminal posts, said conductor members being carried upon each base to dispose said terminal connections at the front of said housing.

10. A cable terminal box comprising a substantially closed chamber, a plurality of terminal posts disposed on one side of the chamber wall, a plurality of protector units each having a base mounted upon the opposite side of said chamber wall, and conductor members including a series of terminal connections for each base in electrical relation with said terminal posts, said conductor members being carried upon each base to dispose said terminal connections for access at the same side of said chamber as said terminal posts.

11. A cable terminal box comprising a chamber, a plurality of terminal posts disposed on one side of the chamber wall, a plurality of protector units each having a base mounted upon the opposite side of said chamber wall, conductor members embedded in and carried by each base in electrical relation with said terminal posts, certain of said conductor members extending substantially transversely of said base to effect contacting relation with said terminal posts, other of said conductors extending longitudinally of said base to extend the circuit thereof forwardly to the front end of said base, and conductor members at the front end of said base providing terminal connections which together with said terminal posts are accessible at the front of said chamber.

12. A cable terminal box comprising a chamber, a plurality of terminal posts disposed on one side of the chamber wall, a plurality of protector units each having a base mounted upon the opposite side of said chamber wall, conductor members carried by each base in electrical relation with said terminal posts, certain of said conductor members also comprising fastening members for said bases upon said chamber wall, other conductor members extending to the front end of said bases, and terminal connections at said front end which, together with said terminal posts, are accessible at the front of said chamber.

13. A cable terminal box comprising a housing, a plurality of protective units, means for mounting said units to the sides of said housing, each protective unit including a fuse and a pair of lightning arresters mounted at opposite ends of said fuse, each lightning arrester being arranged to ground its discharge through said housing.

14. A cable terminal box comprising a housing, a plurality of protective units, means for mounting said units to the sides of said housing, each protective unit including a fuse and a pair of lightning arresters mounted at opposite ends of said fuse, each lightning arrester being arranged to ground its discharge through said housing, one of said lightning arresters grounding high voltages on the customers' line-connections irrespective of the condition of said fuse.

15. A cable terminal box comprising a substantially closed chamber having side walls and a removable front wall, cable wire terminals and subscribers' drop wire terminals carried by said side walls, lightning arresters for grounding abnormal voltages on the circuits in which said terminals are connected, means for mounting all said terminals and said lightning arresters so that they are all accessible when said front wall is removed, and a fanning strip means removable with said front wall for the subscribers' drop wires connected to said subscribers' terminals.

16. A cable terminal box comprising a substantially closed chamber having side walls and a removable front wall, cable wire terminals and subscribers' drop wire terminals carried by said side walls, lightning arresters for grounding abnormal voltages on the circuits in which said terminals are connected, means for mounting all said terminals and said lightning arresters so that they are all accessible when said front wall is removed, and a second set of arresters electrically connected with said subscribers' terminals, said arresters also being accessible at the front of said chamber and adapted to ground abnormal voltages on the subscribers' circuits in which said subscribers' drop wire terminals are connected.

17. A cable terminal comprising a housing, a set of cable wire terminals and a set of subscribers' drop wire terminals carried by the walls of said housing, fuses for connecting the cable wire terminals with the subscribers' drop wire terminals, lightning arresters for grounding abnormal voltages on the circuits in which said terminals are connected, and a second set of arresters electrically connected to one of said terminal sets.

JOHN S. BAKER.